No. 783,015.

Patented February 21, 1905.

UNITED STATES PATENT OFFICE.

LUCAS P. BRITT, OF NEW YORK, N. Y., ASSIGNOR, BY MESNE ASSIGNMENTS, TO FREUND MAYER, OF NEW YORK, N. Y.

EVAPORATED MILK.

SPECIFICATION forming part of Letters Patent No. 783,015, dated February 21, 1905.

Application filed April 22, 1904. Serial No. 204,477.

*To all whom it may concern:*

Be it known that I, LUCAS P. BRITT, a citizen of the United States, and a resident of New York, New York county, State of New York, have invented certain new and useful Improvements in Evaporated Milk; and my preferred manner of carrying out the invention is set forth in the following full, clear, and exact description terminating with claims particularly specifying the novelty.

My invention is a new food product in the form of a paste or powder consisting of the solid constituents of milk substantially unchanged in character by heat, all or most of the water thereof having been evaporated, and is characterized by being readily soluble in water at ordinary temperatures and by the fact that when added to water it forms a permanent solution. The solid or nourishing constituents of the milk have not been substantially changed in their character by heat, with the exception of increasing the sweetness, which results from breaking up the sugar, and therefore when a sufficient proportion of water has been added the result is a liquid which to all intents and purposes is identical with the milk from which it was originally made, save that it is decidedly sweeter—a condition highly desirable in many circumstances.

I am aware that milk-powders produced by the evaporation of milk at relatively high temperatures until only the solid constituents are left have been made before this; but as far as I have been able to learn none of these products are entirely soluble in water and all are greatly changed as to their chemical constituents by the temperature at which evaporation is effected. Some of them when finely ground will apparently make a solution; but if this is undisturbed for a time a sediment will be deposited, showing that it does not form a true or complete solution. When a solution is formed with my product, it is a true solution, and it may be left undisturbed indefinitely without depositing any sediment.

A solution of my product in water looks and tastes substantially like fresh milk, except that it is much sweeter. It will sour, and in other respects acts like fresh milk, and it may be used in cooking as a full equivalent of fresh milk.

In the production of my product all of the water may be evaporated until the product is a dry solid, or a small proportion of water may be left in it, thus leaving it a pasty mass. In the solid or dry state it will keep indefinitely without using any special means or adding anything to prevent its spoiling. It will not readily absorb moisture from the air and will not become rancid or strong even when exposed to summer heats and without protection from the air. It has been found that the product has no reaction from either acid or alkali tests, and it is therefore said to be neutral or of neutral reaction, by which is meant that it has no reaction whatever. It has also been found that the chemical effect upon the natural constituents of the milk is such that the product contains a preservative which is believed to lie in its own accentuated sweetness. Moreover, as no organic substance can long remain in milk without developing bacteria and germs the presence of this preservative, which keeps the product in its pure condition indefinitely, is able also to preserve its purity or keep it free from contaminating influences, as well as to preserve its sweetness and maintain it in a condition of constant preparedness for use.

The following is a description of one mode of producing my improved product, the mode at present preferred by me; but it will be understood that it may be produced by any other efficient process. The milk, which may or may not have had its cream extracted, is placed in a vacuum-pan and the pressure therein reduced as much as may conveniently be done by ordinary means. During the process of evaporation the milk is maintained at as low a temperature as practicable, so as to prevent producing the changes which are caused in milk by heat. I prefer that the temperature shall not rise above 105° Fahrenheit. While the milk is in the vacuum-pan or immediately before I pass a current of electricity of low voltage between separated electrodes through a path in the milk, preferably of two or three volts. This treatment probably breaks up the milk-sugar into two sugars, which have a combined sweetness greater or more apparent to the taste than before. When the milk is reduced to a pasty mass, I remove it from the vacuum-pan and expose it to a current of cool dry air, which completes the evaporation. After it is dry I grind it to a fine powder, so that it may the more quickly be dissolved in water.

I have not here inclaimed the described process of making my product, as the same is the subject-matter of an application for patent filed by me this day and bearing Serial No. 204,478.

Having thus fully described my invention, I claim as new and desire to secure by Letters Patent—

1. A food product consisting of the solid constituents of milk in an uncooked state—characterized by having had nothing added thereto, by being entirely soluble, and by being decidedly sweeter than the milk from which it was made.

2. A food product consisting of the constituents of milk in an uncooked and powdered state—characterized by having had nothing added thereto and all the water extracted therefrom, by being entirely soluble, and by being sweeter than the milk from which it was made.

3. A food product consisting of the solid consistuents of "blue" or skimmed milk in an uncooked state—characterized by having had nothing added thereto, by being entirely soluble, and by being decidedly sweeter than the milk from which it was made.

In testimony whereof I have hereunto subscribed my signature this the 14th day of April, A. D. 1904.

LUCAS P. BRITT.

Witnesses:
JEAN W. DISHMAN,
JAMES STANLEY.